INVENTOR.
ROBERT G. CLARK
BY
Browning, Simms, Hyer, & Eickenroht
ATTORNEYS

May 21, 1968 R. G. CLARK 3,384,894

COMMUNICATIONS SYSTEM FOR SIMULTANEOUS COMMUNICATIONS ON A SINGLE CHANNEL

Filed Nov. 1, 1966 2 Sheets-Sheet 2

INVENTOR.

ROBERT G. CLARK

BY

Browning, Simms, Hyer & Eickenroht

ATTORNEYS

United States Patent Office 3,384,894

Patented May 21, 1968

3,384,894

COMMUNICATIONS SYSTEM FOR SIMULTANEOUS COMMUNICATIONS ON A SINGLE CHANNEL

Robert G. Clark, Austin, Tex., assignor to Mobilradio Incorporated, a corporation of Texas Filed Nov. 1, 1966, Ser. No. 591,284
9 Claims. (Cl. 343—100)

ABSTRACT OF THE DISCLOSURE

A communications system for simultaneous communications on a single channel, including a plurality of directional antennae, each receiving and radiating communications signals in exclusive directions, a receiver linked to each antenna and producing an audio output, and a transmitter. Each receiver and the transmitter are alternatively connected to one of the antennae by an RF coupling network which includes shielded RF sections, each connected to one of said antennae, receivers, or transmitter. The RF sections have movable partitions between them to allow RF coupling between sections. The partitions are moved by solenoids so that when reception is desired from a specific direction a receiver is coupled to the appropriate antenna, and when transmission is desired in that direction only the transmitter is coupled to the antenna. Tone switches may be employed in the receivers so only certain tone signals unmute the receiver. Also, these tone signals and incoming RF signals can be used to cause the solenoids to switch so that the transmitter is automatically switched to the particular antenna on which a desired signal was received upon completion of the incoming call.

This invention relates to a communications system in which different communications may be provided for simultaneously on the same channel with a minimum of interference between the communicating parties.

In two-way radio or television communications, only certain limited frequency spectrums are available for use. These are divided into communications channels for use by commercial, amateur, military, police, and other users. When presently known communications equipment is employed, each available channel can tolerate only a limited number of users, and additional users will cause severe interference or unduly limit the normal use of the channel by all users. Due to the expanded uses and popularity of commercial two-way radio, the available channels are becoming increasingly crowded, especially in metropolitan areas.

It is thus an object of this invention to provide a communications system in which the capacity for carrying communications traffic of any single communications channel is greatly increased.

It is another object of this invention to provide a communications system in which different communications may be carried on simultaneously on the same channel.

It is another object of this invention to provide a communications system in which the number of users normally using it may be increased without any appreciable increase in interference between them.

The above objects are accomplished by dividing the 360° from which a base station can receive communications on a given channel into mutually exclusive directional sectors. In this manner, the base station can receive communications on the same channel, simultaneously, from each directional sector with little or no interference.

Other objects and advantages of this invention will become apparent to those skilled in the art during the course of the following description and with reference to the accompanying drawings, in which.

Communications are generally carried on in such a system within a single communications channel which has the required frequency width for the mode of communications used. For example, when frequency modulation is employed as the mode of communications, the channel may have a band width of 20 kilocycles or greater.

Figure 1:
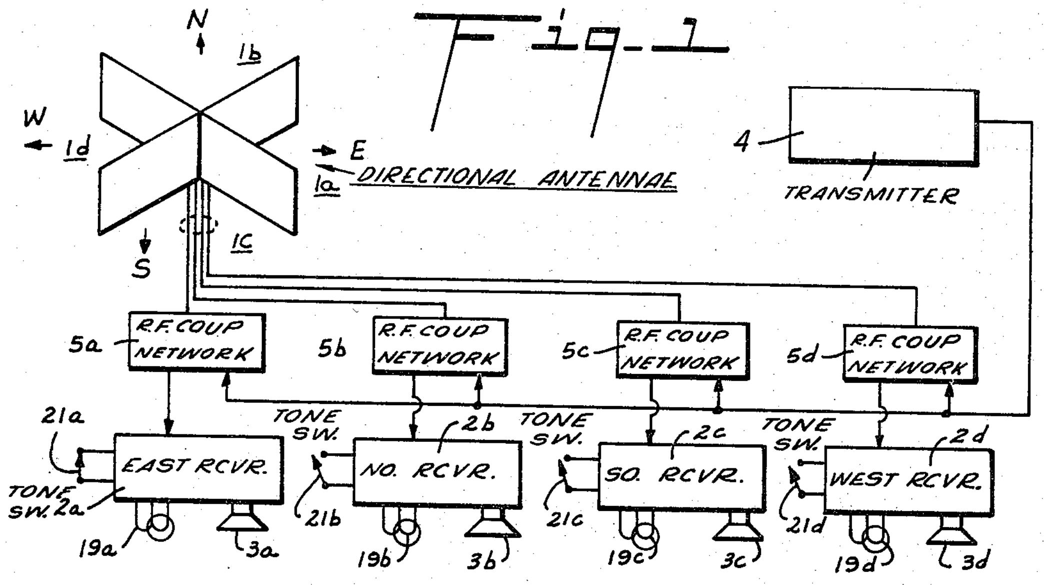
FIGURE 1 is a block diagram of an embodiment of the communications system of this invention.

The base or master station of a two-way communications network utilizing this invention is shown in FIGURE 1. The radiation and reception of signals on the communications channel employed is provided for by a plurality of directional antennae. In the embodiment shown, four antennae 1_a_, 1_b_, 1_c_, and 1_d_ are used. Each antenna is designed to receive and radiate communication signals within a directional sector. For example, the antenna 1_a_ is shown in a position to radiate and receive signals between 45° and 135° in a generally easterly direction. Each directional sector may encompass a certain number of degrees of direction, such as 90° when four antennae are used, exclusive of each other sector. The antenna assigned to radiate and receive signals within a sector must be capable of doing so effectively exclusively within that sector. By "effectively exclusively" it is meant that even though the radiation and reception of signals from each antenna may overlap into other sectors, each antenna will be most effective within its assigned sector.

More than four antennae could be used in the system to provide greater directional selectivity by providing narrower directional sectors. For example, eight antennae effective exclusively within 45° directional sectors, or any other number of antennae could be used.

Since each antenna is radiating and receiving signals only within selected directions, these antennae can each have considerable gain over non-directional antennae generally used so that the effectiveness of communications within each directional sector is greatly increased over that in other communications systems. For example, a well designed corner reflector can have up to 15 db of forward gain and a considerable increase in front to back ratio over a standard dipole antenna.

Each antenna has a number of components associated with it for providing communications in its assigned directional sector and these will occasionally be referred to as being associated in the following description.

Linked to each antenna are a plurality of receiving means In the embodiment shown in FIGURE 1, the receiving means are ordinary communications receivers, 2_a_, 2_b_, 2_c_, and 2_d_, each respectively having audio outputs through speakers, 3_a_, 3_b_, 3_c_ and 3_d_. Each of the receivers 2_a_, 2_b_, 2_c_, and 2_d_ receives signals from its associated antenna, 1_a_, 1_b_, 1_c_, and 1_d_, respectively, and therefore each receiver receives signals only from the directional sector in which its associated antenna is effective.

A transmitter is also provided for transmitting signals on the same channel as the signals received by the receivers. In the embodiment shown in FIGURE 1, signals from a transmitter 4 are radiated by the antennae 1*a*, 1*b*, 1*c* and 1*d* in selected directional sectors as hereinafter described.

Means are also provided for connecting transmitter 4 to and disconnecting said transmitter from at least a selected one of the antennae corresponding to the direction in which transmission is desired and unlinking from the selected antenna the receiving means linked thereto duuring transmission on the antenna. In this manner, while transmitter 4 is transmitting signals on the selected antenna and a selected direction on the channel utilized, signals may be received on the channel from other directions through the remaining antennae and by their associated receivers.

Figure 2:
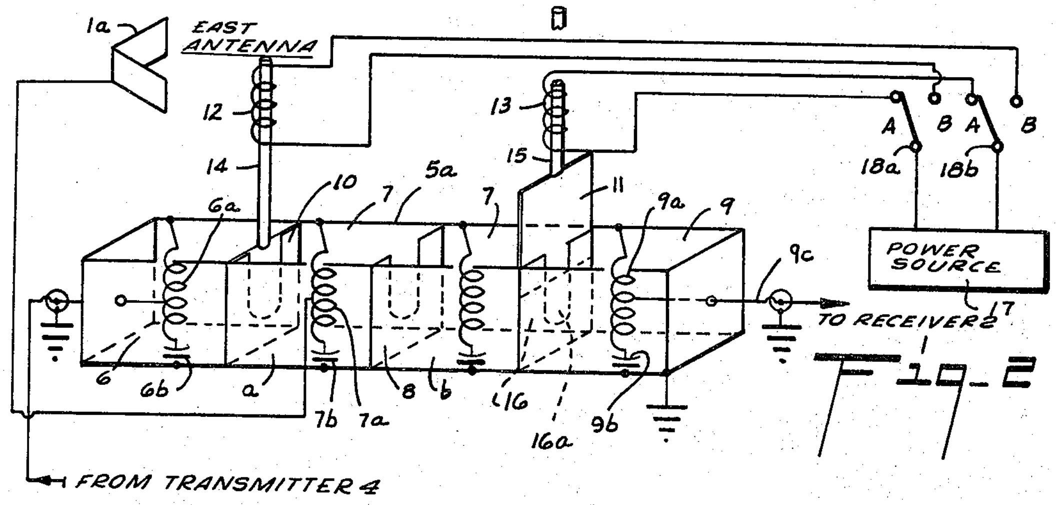
FIGURE 2 is a schematic diagram of one directional antenna and its associated components.

In the embodiment of FIGURES 1 and 2 this connecting means is shown as RF coupling networks 5*a*, 5*b*, 5*c* and 5*d*. Each of the coupling networks includes a plurality of RF sections, each linked respectively to one of the receiving means, its associated antenna and the transmitter 4. Shown in FIGURE 2 is network 5*a* which is identical to the networks 5*b*, 5*c*, and 5*d*, so that the detail description of the network 5*a* applies equally to the other networks. The network 5*a* is comprised of adjacent RF sections 6, 7 and 9, independently shielded from the other. The RF section 7 has two compartments *a* and *b* divided by a partition 8 which has an opening to allow RF coupling between the compartments. Each of the RF sections includes LC networks, such as coil 6*a* and condenser 6*b* in RF section 6, which is coupled to the transmitter 4. The LC network of each section is tuned to the frequency of the channel utilized to provide a resonant circuit at that frequency. As shown in FIGURE 2, antenna 1*a* is connected to the RF section 7 through the coil 7*a* and the condenser 7*b* and the RF section 7 is between adjacent sections linked respectively to the transmitter 4 and the receiver 2*a*. Receiver 2*a* is linked via line 9*c* to the network through the section 9, by being coupled to the coil 9*a* and the condenser 9*b*.

In each of the RF networks a means is provided for alternately coupling the receiving means and the transmitter 4 to the antenna associated with the receiving means through the described RF sections. In the embodiment shown in FIGURE 2 this coupling means comprises windows 10 and 11 which are movable between a position to shield adjacent sections from each other and to a position to permit RF coupling of such sections. The window 10 is disposed between the RF section 6 connected to the transmitter and the RF section 7 connected to the antenna and will be referred to as the transmit window. The window 11 is disposed between the RF section 9 connected to the receiver and the RF section 7 and will be referred to as the receive window. In the embodiment shown, windows 10 and 11 are moved between the positions described by solenoids 12 and 13 operatively connected to the windows by bars 14 and 15. In FIGURE 2 transmit window 10 is in position to shield between RF sections 6 and 7 so that there is no coupling between the coil 6*a* connected to the transmitter 4 and the coil 7*a* connected to the antenna 1*a*. The receive window 11 is in an open position so as to permit coupling between the coil 9*a* linked via line 9*c* to the receiver 2*a* and the coils 7*a* and 7*b* linked to the antenna 1*a*. This coupling is provided through an opening 16*a* in shielded partition 16 between the sections 7 and 9.

In each of the RF networks 5*a*, 5*b*, 5*c* and 5*d* the solenoids 12 and 13 are operated from an appropriate power source 17 through transmit-receive switches such as the 18*a* and 18*b* shown in FIGURE 2 as associated with the RF network 5*a*. In FIGURE 2 the switches 18*a* and 18*b* are shown in the receive position A so that power is supplied to the solenoid 13 to open the receive window 16 and no power is supplied to the solenoid 12 so that the transmit window 10 is closed. When the switches 18*a* and 18*b* are in the transmit position B, the power is supplied to the solenoid 12 and the transmit window 10 is open while no power is supplied to the solenoid 13 and the receive window 11 is closed.

In the embodiment shown in FIGURES 1 and 2, with all the transmit-receive switches in the receive position A, generally when a signal representing a call from another station is received on one of the directional antennae, this signal is picked up through the associated receiver. The receiver produces an output signal acceptable for communication when voice is utilized as the mode of communication, such as an audio signal through the speaker 3. For example, a call from the eastern sector will be received through the antenna 1*a* by the receiver 2*a*. In answering this call the operator switches only the transmit-receive switches 18*a* and 18*b*, associated with the network 5*a* from the position A to the position B to couple the transmitter 4 to the antenna 1*a*. Signals from the transmitter 4 may now be transmitted in the sector via the antenna 1*a* by turning on the transmitter 4. While the operator is transmitting signals to the calling station through the antenna 1*a*, signals in other directions may be received by the remaining antannae and their associated receivers, as the transmit-receive switches associated wth the RF network 5*b*, 5*c* and 5*d* were not switched to the position B.

When the master station is calling out and the location of a station to be called is not known, transmit-receive switches associated with all the networks 5*a*, 5*b*, 5*c* and 5*d*, can be switched to the position B thus opening the transmit windows 10. Then transmission can be made from the transmitter 4 on all the antennae 1*a*, 1*b*, 1*c* and 1*d* in all directions. In such a case, if the answering station is received by a specific receiver from a specific direction and on a specific antenna, transmission thereafter need only be made on this antenna leaving the rest of the directional sectors clear for other communication. Thus, if the answer was detected as received on the receiver 2*a*, transmissions would thereafter be made to the answering station on the antenna 2*a*.

A means is provided for indicating on which antenna and thus which direction a signal is being received in order to aid the operator of the master station in selecting the direction in which to transmit or answer. In the embodiment shown in FIGURE 1, this means is shown as a visual indicator such as light bulbs 19*a*, 19*b*, 19*c* and 19*d* connected to each of the receivers 2*a*–2*d*. The indicating means can be connected to any appropriate place in the receiver or on the coil 9*a* where a voltage or current is developed in response to the receipt of signals by the receiver from its associated antenna. For example, the automatic volume control voltage present in most communications receivers can be used to cause the bulbs 19*a*, 19*b*, 19*c* and 19*d* to indicate.

In FIGURE 1 each of the receiving means 2*a*–2*d* may be provided with a means for muting its audio output until it receives from its associated antenna a signal of predetermined characteristics. One way of accomplishing this is to place a tone sensitive switch in the audio section of the receiver which interrupts transmission of audio signals to the speaker 3 except upon receipt of a predetermined tone. These means are shown in FIGURE 1 as the switches 21*a*, 21*b*, 21*c* and 21*d*, each, respectively, connected appropriately within the receivers 2*a*, 2*b*, 2*c* and 2*d* to mute the audio output of these receivers when open. In this way when a number of different users are utilizing the same channel, each user may be assigned a distinctive tone and the receiving equipment at his station will produce an audio output only upon receipt of signals bearing this distinctive tone. Although the signals from other users will be received on the antennae, only desired signals will be heard. Thus in the example shown, since the switch 21*a* is closed and the remaining switches open, only those signals received from the eastern sector through the antenna 1*a* will be heard by the operator (if they have the correct tone) through the speaker 3*a* on the receiver 2*a*. The switch 21*a* would be closed by receipt of a signal bearing the correct tone by the receiver 2*a*. It can readily be understood by those skilled in the art that channel crowding is greatly reduced in this manner because only desired calls will be heard and these can be answered within a specific directional sector.

Figure 3:
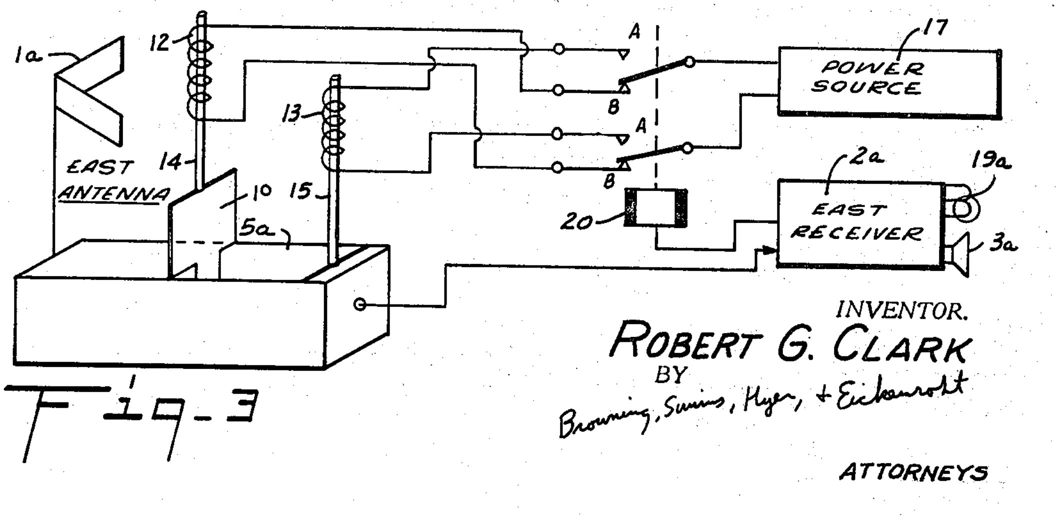
FIGURE 3 is a schematic diagram of an alternate arrangement of one directional antenna and its associated components.

To further facilitate the utilization of this invention a means can be provided for actuating the solenoids 12 and 13 automatically upon receipt of an acceptable signal by the receiving means. In FIGURE 3 in which the antenna radiating and receiving signals in one directional sector is shown along with its associated components for purposes of illustration, a relay 20 is connected between the power source 17 and the solenoids 12 and 13. The relay 20 is latched in the closed position in response to receipt of a signal from the receiver 2*a* and the keying of transmitter 4 so that its poles move from the receive position A to the transmit position B, while the transmitter is in the keyed or on position. For example, when a call is received through the antenna 1*a* from the eastern sector by the receiver 2*a*, a signal is generated in this receiver which actuates the relay 20 when transmitter 4 is keyed on to switch the power source 17 from the solenoid 13 to the solenoid 12. Again the AVC voltage may be used for this purpose. In this manner the transmitter 4 is automatically coupled to the antenna 1*a* and the operator need only turn on the transmitter 4 to transmit in the eastern sector only to answer the call. Where the receiver is provided with the tone actuated switch, the channel can be better utilized by a single operator by actuating the relay 20 through the tone actuated switch so that the switching to the transmitter 4 occurs only upon receipt of a signal carrying a predetermined tone, and other signals are ignored.

During periods of exceptional channel crowding, a single base station may utilize two systems identical to the one described above except that each system will only radiate and receive signals on the channel in directional sectors exclusive of the other. For example, one system can be used by one operator to handle traffic in the northern and eastern directional sectors and the second system can be used by a second operator to handle traffic in the southern and western directional sectors.

Figure 4:
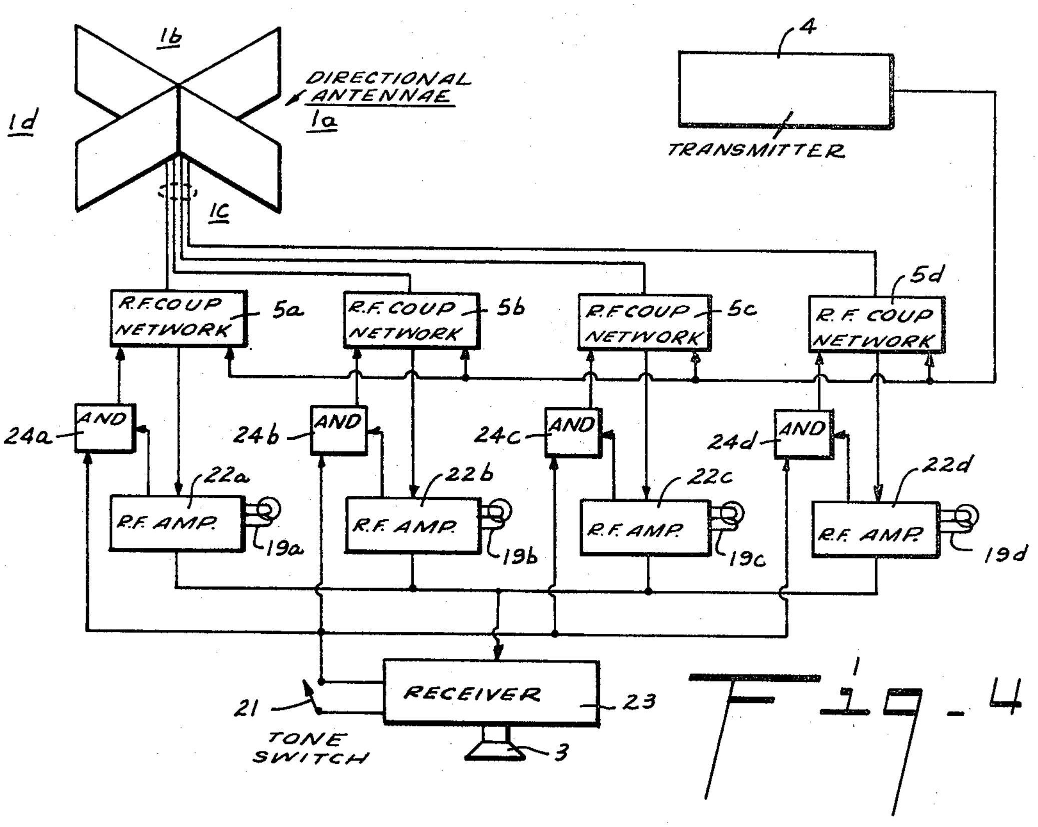
FIGURE 4 is a block diagram of another embodiment of the communications system of this invention.

In the above description each receiving means was described as a communications receiver. As shown in FIGURE 4, each of these means may also be RF amplifiers 22*a*, 22*b*, 22*c*, and 22*d* each connected to a means for converting their output to an audio output. This latter means may be a communications receiver 23 the input of which is connected to the output of each of the RF amplifiers 22*a*, 22*b*, 22*c*, and 22*d*. Each of the indicating means 19*a*, 19*b*, 19*c* and 19*d* is connected to one of the RF amplifiers and indicates receipt by that amplifier of a signal from its associated antenna, as previously described.

Figure 5:
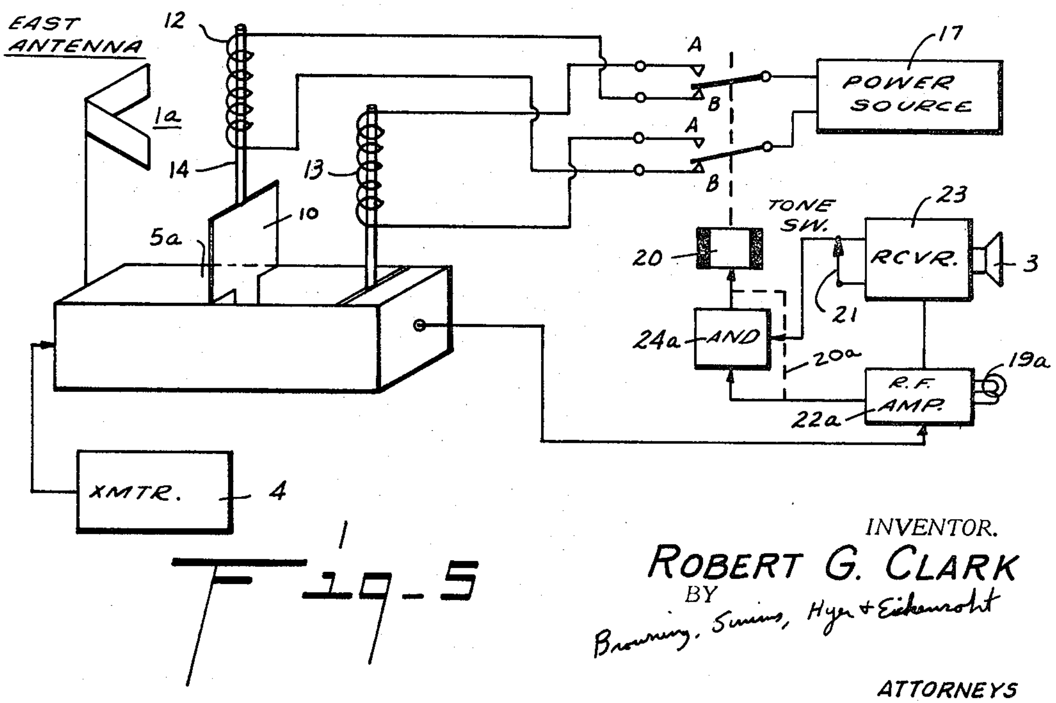
FIGURE 5 is a schematic diagram of one directional antenna and its associated components as used in the system of FIGURE 4.

Also, the relays 20 (FIGURE 5) actuating each of the RF coupling networks 5*a*, 5*b*, 5*c* and 5*d* can be actuated through the keying system of transmitter 4 (not shown) and by a signal from the associated RF amplifiers upon receipt by that RF amplifier of a signal from its associated antenna. In FIGURE 5, when transmitter 4 is keyed on a signal from the RF amplifier 22*a*, which is generated in response to the receipt of a signal from the antenna 1*a*, may cause the relay 20 to switch from the receive position A to the transmit position B to connect power source 17 to the solenoid 12, thus closing the transmit window 10. This signal may also be used to cause the bulb 19*a* to indicate.

The muting means, such as the tone sensitive switch 21, may also be used with the receiver 23 so that its audio output is muted except upon the receipt of signals of predetermined characteristics. In the embodiment of FIGURE 4, if this muting means is used and if each relay 20 is to be switched automatically upon completion of a call from a particular directional sector, the signal from the RF amplifier 22*a* which normally actuates the relay 20 must be combined with a signal from the receiver 23, generated upon the unmuting of its audio, so that the relay 20 is switched only when both of these signals are present and transmitter 4 is keyed. AND type circuits 24*a*, 24*b*, 24*c*, and 24*d* may be provided for combining these two signals. Thus, in FIGURES 4 and 5, when a call is received on the antenna 1*a* which bears the proper tone assigned to the user of the base station, this call is received through the RF amplifier 22*a* and the receiver 23 and unmutes its audio output by closing the tone switch 21. Signals are sent to the AND circuit 24*a* from the RF amplifier 22*a*, in response to the receipt of the call, and from tone switch 21 in the receiver 23, in response to receipt of a call with the proper tone, and an output is produced by this AND circuit which causes the relay 20 to switch when transmitter 4 is keyed on so that the transmitter 4 is connected to the antenna 1*a*. The operator need only turn on the transmitter 4 to transmit his answer in the proper directional sector. The components associated with the other antennae 1*b*, 1*c*, and 1*d* operate in the same manner.

In FIGURE 5, when the relay 20 is actuated in response to a signal from the RF amplifier 22*a*, the AND circuit 24*a* may be bypassed. The relay 20 should be connected to the RF amplifier 22*a* for receipt of signals therefrom, as shown by the dotted line 20*a* in FIGURE 5.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A communications system for permitting a plurality of different communications on the same channel simultaneously, comprising: a plurality of directional communication antennae each adapted to radiate and receive signals on the same communications channel in a directional sector effectively exclusive of the other antennae; a plurality of receiving means each linked to only one of said antennae for receipt of signals therefrom on said channel and each producing an audio output; means for muting said audio output from each of said receiving means except the audio output of a receiving means receiving a signal of predetermined characteristics from its associated antenna; a transmitter for sending signals to be radiated on said channel to said antennae; means for connecting said transmitter to and disconnecting said transmitter from at least a selected one of said antennae corresponding to the directional sector in which transmission is desired and unlinking from said selected antenna during transmission thereon the receiving means otherwise linked thereto; and means for actuating said connecting means in response to the unmuting of the audio ouput from the receiving means associated with said antenna, whereby, when said transmitter is transmitting signals in at least one selected directional sector on said channel through at least said selected one of said antennae, signals from other directional sectors may be received on said channel through the remaining antennae.

2. The system of claim 1 further provided with means for indicating on which of said antenna a signal is received.

3. The system of claim 1, wherein the signals having predetermined characteristics are tone signals and the means for muting said audio signal is a tone-actuated switch.

4. A communications system for permitting a plurality of different communications on the same channel simultaneously, comprising: a plurality of directional communication antennae each adapted to radiate and receive signals on the same communications channel in a directional sector effectively exclusive of the other antennae; a plurality of receiving means each linked to only one of said antennae for receipt of signals therefrom on said channel and each including an RF section producing an RF output signal; means for converting said output signal to an audio output; a transmitter for sending signals to be radiated on said channel to said antennae; means for connecting said transmitter to and disconnecting said transmitter from at least a selected one of said antennae corresponding to the directional sector in which transmission is desired and unlinking from said selected antenna during transmission thereon the receiving means otherwise linked thereto; and means for actuating said connecting means to connect the transmitter to said one of said antennae in response to receipt of a signal of predetermined characteristics by one of said receiving means from its associated antenna, whereby when said transmitter is transmitting signals in at least one selected directional sector on said channel through at least said selected one of said antennae, signals from other directional sectors may be received on said channel through the remaining antennae.

5. The system of claim 4 further provided with means for indicating on which of said antenna a signal is received.

6. The system of claim 4, wherein said actuating means comprises a relay connected to said connecting means and adapted to connect said connecting means to a power source, and an AND circuit connected to one of said receiving means, to said converting means and to said relay, said AND circuit producing an output for actuating said relay upon receipt of a signal from said receiving means in response to receipt of a signal by said means from its associated antenna, and the receipt of a signal from said converting means in response to the receipt of a said signal of predetermined characteristics.

7. A communications system for permitting a plurality of different communications on the same channel simultaneously, comprising: a plurality of directional communication antennae each adapted to radiate and receive signals on the same communications channel in a directional sector effectively exclusive of the other antennae; a plurality of receiving means each linked to only one of said antennae for receipt of signals therefrom on said channel and each producing an output acceptable for communications; a transmitter for sending signals to be radiated on said channel to said antennae; and means for connecting said transmitter to and disconnecting said transmitter from at least a selected one of said antennae corresponding to the directional sector in which transmission is desired and unlinking from said selected antenna during transmission thereon the receiving means otherwise linked thereto, said connecting means including a plurality of RF coupling networks, each network including a plurality of RF sections each linked, respectively, to one of the receiving means, its associated antenna, and said transmitter, and each of said networks including a means for alternately coupling the receiving means and the transmitter to the associated antenna, whereby when said transmitter is transmitting signals in at least one selected directional sector on said channel through at least said selected one of said antennae, signals from other directional sectors may be received on said channel through the remaining antennae.

8. The system of claim 7 wherein said coupling means includes a window located between adjacent RF sections and movable between a position to shield said sections from each other and a position to permit RF coupling of said sections, and a solenoid operatively connected to said window for selectively moving the window between said positions.

9. A communications system permitting a plurality of different communications simultaneously on the same channel comprising: a plurality of directional communication antennae each adapted to radiate and receive signals on the same communications channel within different directional sectors; a plurality of receiving means each coupled to only one of said antennae for receipt of signals therefrom and each producing an output acceptable for communications; a transmitter adapted to generate and send signals to be radiated on said channel to each of said antennae; RF coupling means for coupling said transmitter to at least a selected one of said antennae corresponding to the directional sector in which transmission is desired, and decoupling from said selected antenna during transmission thereon the receiving means otherwise coupled thereto, said RF coupling means including means adapted to prevent any substantial conduction of RF energy from said transmitter to all but said selected one of said antenna and their associated receivers during said transmission, whereby when said transmitter is transmitting signals in at least one selected directional sector on said channel through at least said selected one of said antennae, signals from other directional sectors may be received on said channel through the remaining antennae.

References Cited

UNITED STATES PATENTS

| | | | |
|---|---|---|---|
| 2,935,606 | 5/1960 | Harrison et al. | 325—21 X |
| 2,234,244 | 3/1941 | Gossel | 343—100 |
| 3,274,598 | 9/1966 | Cleeton | 343—100 |
| 3,319,169 | 5/1967 | Axe | 325—392 |

RODNEY D. BENNETT, *Primary Examiner.*

T. H. TUBBESING, *Assistant Examiner.*